United States Patent [19]

Ono et al.

[11] Patent Number: 5,095,100
[45] Date of Patent: Mar. 10, 1992

[54] METAL COMPLEX DYES AND PREPARATION THEREOF

[75] Inventors: Takashi Ono, Takatsuki; Tatsuya Yagyu, Yahata; Katsumi Fukuda, Osaka; Minako Terasaki, Moriguchi, all of Japan

[73] Assignee: Orient Chemical Industries, Ltd., Osaka, Japan

[21] Appl. No.: 537,904

[22] Filed: Jun. 12, 1990

[30] Foreign Application Priority Data

Jun. 13, 1989 [JP] Japan ................................ 1-151421
Jun. 19, 1989 [JP] Japan ................................ 1-156404

[51] Int. Cl.$^5$ .................. C09B 45/24; C09B 45/38; C09B 29/095; D06P 5/00
[52] U.S. Cl. ............................ 534/625; 534/663; 534/677; 534/680; 534/684; 534/693; 534/700; 534/709; 534/715; 534/716; 534/717
[58] Field of Search ............ 534/663, 669, 677, 680, 534/684, 685, 715, 666, 625, 693, 700, 709, 716, 717, 714, 715

[56] References Cited

U.S. PATENT DOCUMENTS

| | | | |
|---|---|---|---|
| 2,095,484 | 10/1937 | Taube et al. ................. | 534/714 X |
| 2,638,468 | 5/1953 | Wehrli ............................ | 534/715 |
| 2,644,812 | 7/1953 | Ruckstuhl et al. ............. | 534/715 |
| 2,842,538 | 7/1958 | Byland ............................ | 534/715 X |
| 2,941,991 | 6/1960 | Byland ............................ | 534/715 |
| 3,038,893 | 12/1962 | Andrew et al. ................ | 534/625 X |
| 3,057,844 | 10/1962 | Andrew et al. ................ | 534/625 X |
| 4,091,021 | 5/1978 | Andrew et al. ................ | 534/625 X |

FOREIGN PATENT DOCUMENTS

| | | | |
|---|---|---|---|
| 347803 | 12/1989 | European Pat. Off. ........... | 534/680 |
| 49-117780 | 11/1974 | Japan ................................ | 534/680 |
| 280083 | 11/1989 | Japan ................................ | 534/680 |
| 1395397 | 5/1975 | United Kingdom ............. | 534/666 |
| 1472815 | 5/1977 | United Kingdom ............. | 534/680 |

OTHER PUBLICATIONS

Zollinger, Azo and Diazo Chemistry, Interscience Publishers, New York, 1961, p. 359.

*Primary Examiner*—David B. Springer
*Assistant Examiner*—Fiona T. Powers
*Attorney, Agent, or Firm*—McGlew & Tuttle

[57] ABSTRACT

Metal complex dyes comprising a metalizable azo compound represented by one of Formulas [I] through [IV]:

In Formulas [I] through [IV], Ps represents a phosphono group in the form of a free acid or a salt; Sf represents a sulfo group in the form of a free acid or a salt; m is 0, 1 or 2. $R^1$ represents a hydrogen atom or an amino group; X represents a hydroxyl group, an alkoxy group having a carbon number of 1 or 2 or a carboxyl group. Y represents a hydroxyl group, an alkoxy group having a carbon number of 1 or 2, a carboxyl group or a methyl group; $R^2$ represents a hydrogen atom or a hydroxyl group; A represents a phenyl group or naphthyl group selected from the group comprising the following ① through ④:

(Abstract continued on next page.)

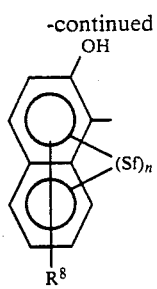

In the above formulas (1) through (4), Sf has the same definition as above; n is 0, 1 or 2. $R^3$ represents a hydroxyl group or a carboxyl group; $R^4$ represents a hydroxyl group, a carboxyl group or an amino group; $R^5$ and $R^6$ independently represent a hydroxyl group or a carboxyl group; $R^7$ and $R^8$ independently represent a hydrogen atom, a hydroxyl group or an amino group. B has the same definition as A above except that $R^3$ represents a hydroxyl group, a carboxyl group or an amino group. $R^9$ represents a hydrogen atom, a methyl group, an alkoxy group having a carbon number of 1 or 2 or a sulfo group in the form of a free acid or a salt; D represents a coupling component residue having a metalizable hydroxyl group at the position adjoining to the azo group.

Use of these metal complex dyes makes it possible to dye metal-tanned leather with good permeability and excellent color fastness to rubbing and color fastness to light.

13 Claims, No Drawings

METAL COMPLEX DYES AND PREPARATION THEREOF

BACKGROUND OF THE INVENTION

1. Field of the Invention

The present invention relates to a new metal complex dye used mainly for leather dyeing, a method of its production and a metal-tanned leather dyeing method using said metal complex dye. 2. Description of the Prior Art The majority of dyes used for leather dyeing are anionic dyes having a water-soluble group, such as acid dyes, direct dyes, metal complex dyes and mordant dyes. For dyeing chromium-tanned leather and other highly cationic leather, dyes having a sulfo group have conventionally been used in almost all cases.

For example, Japanese Patent Publication Open to Public Inspection Nos. 40357/1983, 59871/1981, 171776/1982, 171778/1982 and 259685/1985 propose metal complex dyes with the aim of improving various properties including color fastness to rubbing, color fastness to water, color fastness to washing, color fastness to light, dyeing property, leveling property and permeability. These dyes all have a sulfo group or a carboxyl group as a water-soluble group.

However, the dyes and dyeing methods which have conventionally been used to dye leather, particularly metal-tanned leather, are not fully satisfactory with respect to dyeing power, color fastness to rubbing and permeability.

The present invention was developed in consideration of these aspects. The object of the invention is to provide a metal complex dye that offers good permeability and excellent color fastness to rubbing and color fastness to light particularly in metal-tanned leather dyeing, a method of its production and a metal-tanned leather dyeing method.

SUMMARY OF THE INVENTION

The object described above is accomplished by metal complex dyes comprising one of metalizable azo compounds respectively represented by Formulas [I] through [IV] shown below:

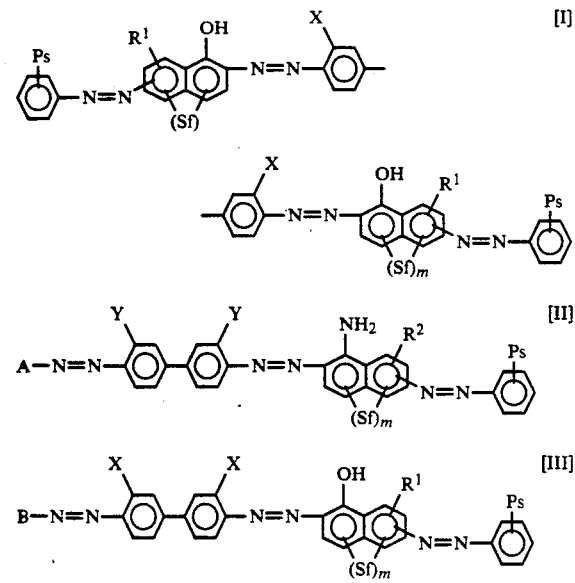

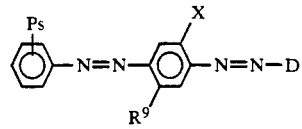

In Formulas [I] through [IV], Ps represents a phosphono group in the form of a free acid or a salt; Sf represents a sulfo group in the form of a free acid or a salt; m is 0, or 2. $R^1$ represents a hydrogen atom or an amino group; X represents a hydroxyl group, an alkoxy group having a carbon number of 1 or 2 or a carboxyl group. Y represents a hydroxyl group, an alkoxy group having a carbon number of 1 or 2, a carboxyl group or a methyl group; $R^2$ represents a hydrogen atom or a hydroxyl group; A represents a phenyl group or naphthyl group selected from the group comprising the following ① through ④:

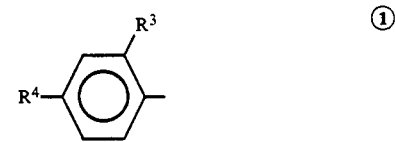

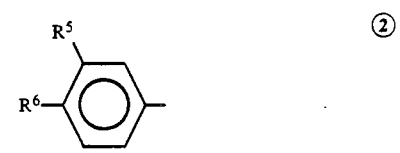

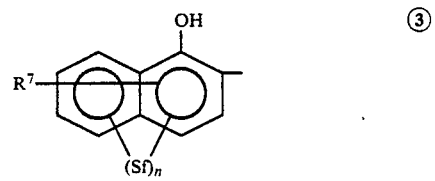

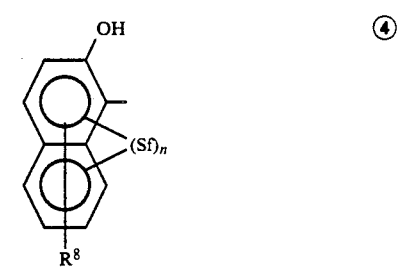

In the above formulas ① through ④, Sf has the same definition as above; n is 0, 1, or 2. $R^3$ represents a hydroxyl group or a carboxyl group; $R^4$ represents a hydroxyl group, a carboxyl group or an amino group; $R^5$ and $R^6$ independently represent a hydroxyl group or a carboxyl group; $R^7$ and $R^8$ independently represent a hydrogen atom, a hydroxyl group or an amino group. B has the same definition as A above except that $R^3$ represents a hydroxyl group, a carboxyl group or an amino group. $R^9$ represents a hydrogen atom, a methyl group, an alkoxy group having a carbon number of 1 or 2 or a sulfo group in the form of a free acid or a salt; D represents a coupling component residue having a metalizable hydroxyl group at the position adjoining to the azo group.

Note that in the present specification "the position adjoining to the azo group" means the position adjacent or ortho to the azo group, i.e. "the second position as counted from the carbon atom bound with the azo group."

Also, the metal-tanned leather dyeing method of the present invention to accomplish the object described above comprises dyeing metal-tanned leather with a metal complex dye comprising a metalizable azo compound represented by one of Formulas [I] through [IV]

compound, trisazo compound or tetrakisazo compound represented by one of Formulas [I] through [IV] shown above. Examples of metal complex dyes comprising a metalizable azo compound represented by Formula [I] include those having a structure like the following Formula [a]:

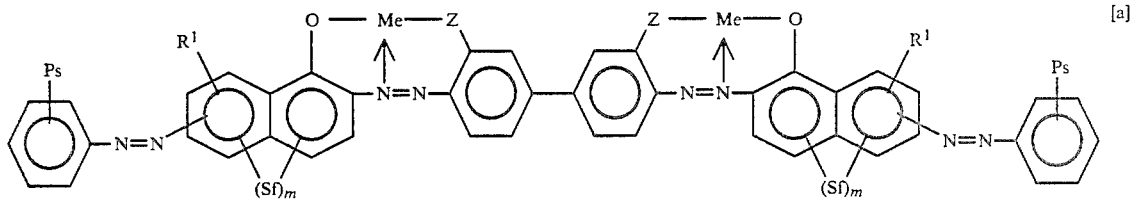

Examples of metal complex dyes comprising a metalizable azo compound represented by Formula [II] include those having a structure like the following Formulas [b] through [d]:

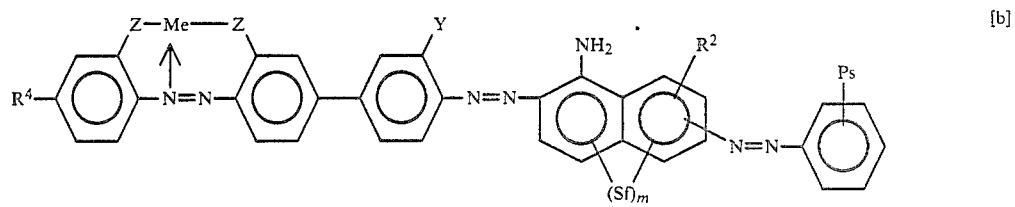

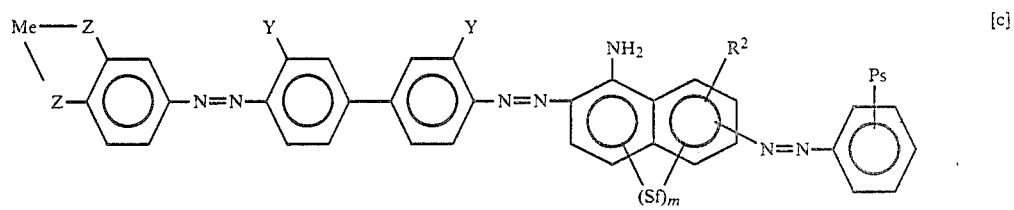

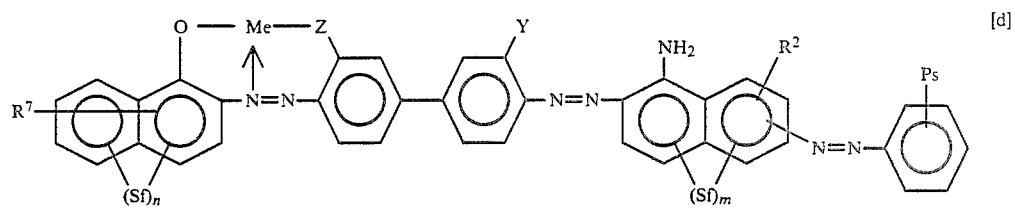

shown above.

DESCRIPTION OF THE PREFERRED EMBODIMENTS

The metal complex dye of the present invention described above can be obtained by metalizing a disazo Examples of metal complex dyes comprising a metalizable azo compound represented by Formula [III] include those having a structure like the following Formulas [e] through [h]:

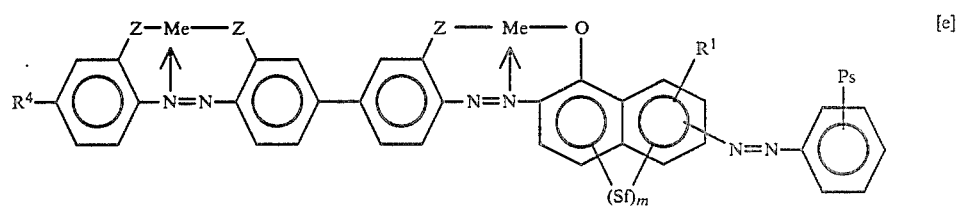

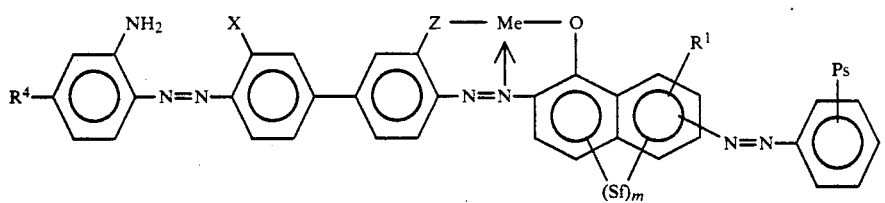
[f]

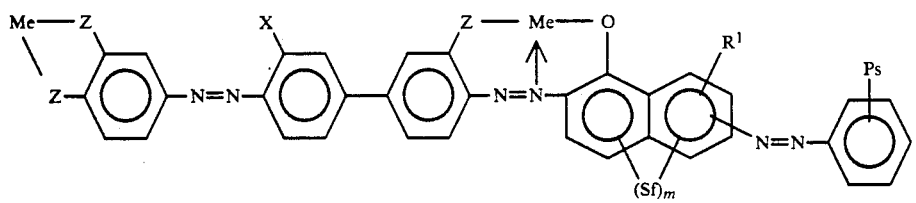
[g]

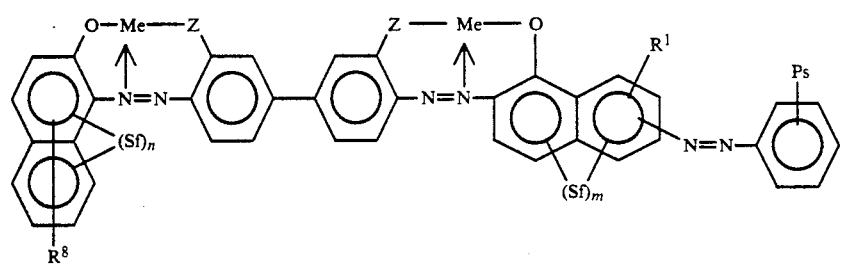
[h]

Examples of metal complex dyes comprising a metalizable azo compound represented by Formula [IV] include those having a structure of the following Formula [i]:

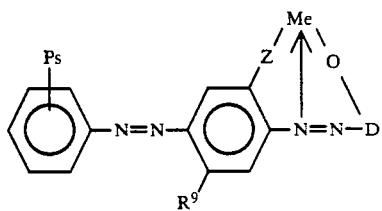
[i]

In Formulas [a] through [i], Ps, Sf, $R^1$, $R^2$, $R^4$, $R^7$, $R^8$, $R^9$, X, Y, D, m and n have the same definitions as above. Z represents —O— or —COO—; Me represents a metal such as copper, nickel, cobalt, iron or chromium. The metalizable hydroxyl group in D is represented by —O— when metalized.

Concerning the metal Me, at most two atoms thereof are coordinated per compound molecule in most cases in compounds of Formula [I] and [III], but metal complex dyes wherein either atom alone is coordinated are included in the scope of the present invention.

In the present invention, Ps is a phosphono group that is substituted at the o-, m- or p-position to the azo group, and exists in the form of a free acid or a salt.

If this phosphono group is represented by —P(=O)-(OM)$_2$, M will be hydrogen when the phosphono group is in the form of a free acid, and M will be an alkali metal such as sodium, potassium or lithium, an ammonium such as NH$_4$ or an amine such as alkanolamine when the phosphono group is in the form of a salt.

Also, the dye of the present invention may have a sulfo group.

In this case, the sulfo group takes the form of a free acid or a salt like the phosphono group described above.

If this sulfo group is represented by —SO$_3$M, M will be hydrogen when the sulfo group is in the form of a free acid, and M will be an alkali metal, an ammonium or an amine when the sulfo group is in the form of a salt.

In the dye of the present invention, the M units contained in the one or two phosphono groups and one or two or more sulfo groups may be identical with each other or not.

A metalizable azo compound represented by Formula [I] shown above can be obtained by reacting the diazonium salt of o-, m- or p-aminobenzenephosphonic acid with a naphthol that forms Formula [V]:

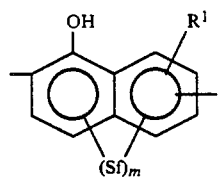
[V]

wherein $R^1$, Sf and m have the same definitions as above, or a sulfonic acid derivative thereof, under acidic conditions to yield a monoazo compound represented by Formula [VI]:

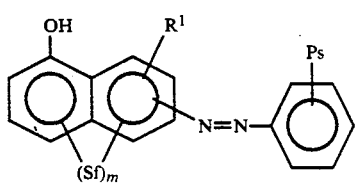
[VI]

wherein $R^1$, Ps, Sf and m have the same definitions as above, and subsequently coupling the monoazo compound with the tetrazonium salt of a benzidine derivative represented by Formula [VII]:

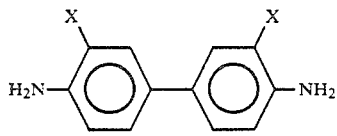

wherein X has the same definition as above, under alkaline conditions.

A metal complex dye comprising a metalizable azo compound represented by Formula [II] shown above can be obtained by reacting the tetrazonium salt of a benzidine derivative represented by Formula [VIII]:

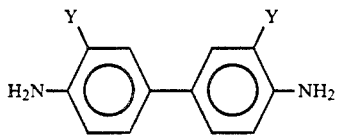

wherein Y has the same definition as above, with a coupler that forms Formula [IX]:

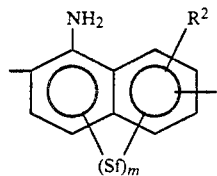

wherein $R^2$, Sf and m have the same definitions as above, under acidic conditions to yield a compound represented by Formula [X]:

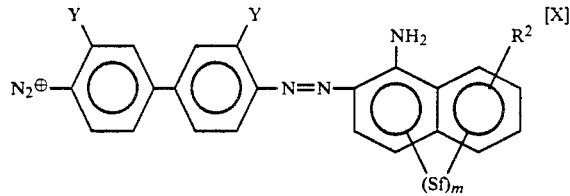

wherein Y, $R^2$, Sf and m have the same definitions as above, followed by reaction of the compound with the diazonium salt of o-, m- or p-aminobenzenephosphonic acid under alkaline conditions, and subsequently further reacting the reaction product with a coupler that forms A (A has the same definition as above) preferably under neutral conditions.

A metalizable azo compound represented by Formula [III] shown above can be obtained by reacting the tetrazonium salt of a benzidine derivative represented by Formula [VII] shown above with a coupler that forms B (B has the same definition as above) under acidic, neutral or alkaline conditions, and subsequently reacting the reaction product with a monoazo compound represented by Formula [VI] shown above.

A metalizable azo compound represented by Formula [IV] shown above can be obtained by coupling the diazonium salt of o-, m- or p-aminobenzenephosphonic acid with an aniline or aminobenzene derivative having substituents X and $R^9$ (X and $R^9$ have the same definitions as above) to yield a monoazo compound represented by Formula [XI]:

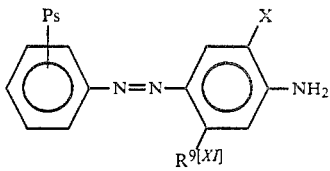

wherein Ps, X and $R^9$ have the same definitions as above, and subsequently reacting the diazonium salt of the monoazo compound with a coupler that forms a coupling component residue D (D has the same definition as above).

Examples of compounds selected as appropriate for the production of azo compounds of Formulas [I] through [IV] shown above are given below.

The aminobenzenephosphonic acid may be o-, m- or p-aminobenzenephosphonic acid, with preference given to m- or p-aminobenzenephosphonic acid.

Examples of benzidine derivatives include 3,3'-dihydroxybenzidine, 3,3'-dimethoxybenzidine, 3,3'-diethoxybenzidine, 3,3'-dicarboxybenzidine and 3.3'-dimethylbenzidine.

Examples of the coupling component that forms Formula [V] include H-acid, S-acid and K-acid.

Examples of the coupling component that forms Formula [IX] include H-acid, S-acid and K-acid.

Examples of the coupler that forms A include m-hydroxybenzoic acid, m-aminophenol, m-phenylenediamine, pyrocatechol, salicylic acid, H-acid, S-acid, K-acid, M-acid, chromotropic acid, J-acid, 2R-acid, R-acid, NW-acid and Schaffer's acid.

Examples of the coupler that forms the coupling component residue D (hereinafter referred to as coupler D) include β-naphthols, α-naphthols, pyrazolones, phenols and acetoacetic anilide derivatives.

Examples of substances preferable for the coupler D include naphthols such as 8-amino-2-naphthol, Schaffer's acid, R-acid, G-acid, γ-acid, H-acid, J-acid, S-acid, SS-acid, L-acid, M-acid, 2R-acid, NW-acid and K-acid and sulfonic acid derivatives thereof; pyrazolones such as 3-methyl-5-phenylpyrazolone and derivatives thereof; phenols such as resorcinol, cresol and p-phenylphenol; and acetoacetic anilide.

Examples of the aniline or aminobenzene derivative having substituents X and $R^9$ described above include cresamine, p-cresidine, o-anisidine, o-phenetidine, 2,5-dimethoxyaniline, 3-amino-4-hydroxybenzenesulfonic acid and anthranilic acid.

A metal complex dye of the present invention can be obtained by reacting an azo compound described above with a metal provider in water and/or an organic solvent under acidic or basic conditions. Metalization for this purpose can be carried out by a method known per se, e.g. the method described in Japanese Patent Publication Open to Public Inspection No. 40357/1983.

Specifically, it can be obtained by carrying out reaction at 70° to 150° C. in water and/or an organic solvent under acidic or basic conditions in the presence of a metal provider added in a given ratio per mol of a metalizable polyazo compound represented by one of Formulas [I] through [IV] until the compound becomes completely unrecognizable.

The amount of the metal provider used varies according to the compound, but if the number of metal atoms coodinated per compound molecule is written q, it is preferable that the amount of the metal be (1.0 to 1.5)×q gram atom.

In accordance with the production method described above, a copper, nickel, cobalt, iron or chromium complex dye comprising a metalizable azo compound represented by Formula [I] or Formula [III] is obtained as a metal complex dye wherein 1 or 2 metal atoms are coordinated per compound molecule. Also, a copper or nickel complex dye comprising a metalizable azo compound represented by Formula [IV] is obtained as a 1:1 type complex dye, and a cobalt, iron or chromium complex dye is obtained as a 1:1 type and/or 1:2 type complex dye.

The resulting metal complex dye can be isolated by a direct means such as spray drying or drum drying, or acidization or salting-out. Also, the metal complex dye can be obtained as a desired amine salt by treating the acidization product with amine.

Examples of solvents which can be used for metalization include water-soluble organic solvents such as formamide or dimethylformamide and glycols or monoalkyl ethers thereof.

Examples of metal providers which can be used include the copper, nickel, cobalt, iron or chromium salt of organic or inorganic acid. Examples of copper providers include copper sulfate, copper chloride, copper acetate, copper formate and copper carbonate. Examples of nickel providers include nickel sulfate, nickel chloride, nickel acetate and nickel formate. Examples of other usable metal providers include cobalt acetate, cobalt chloride, ferric chloride, chromium acetate, chromium formate, chromium sulfate and chromium salicylate.

Metalization is preferably carried out in the presence of the carbonate of an alkali metal or alkaline earth metal or ammonia or a lower amine.

In the production method described above, when the substituent X or Y in the azo compound is an alkoxy group having a carbon number of 1 or 2, it is preferable to carry out metalization in an organic solvent.

The new metal complex dye having a phosphono group thus obtained can be used for dyeing by a processing method similar to that for conventional acid dyes at a temperature of about 50° C. and pH 3 to 6 as needed for leather dyeing.

An ordinary dyeing process can be used for the process of dyeing metal-tanned leather.

The types of metal tanning of leather to be dyed include aluminum tanning, titanium tanning and zirconium tanning as well as chromium tanning.

An example of the dyeing process is given below.

Chrome-tanned leather shaven to a given thickness is subjected to washing and neutralization for pretreatment processes, and then dyed. Formic acid is added for fixation, followed by stuffing and neutralization.

The washing process for pretreatment is carried out to remove the unbound portion of the tanning agent from the leather, remove the unbound portion of the acid from the leather, remove the foreign matter adhering to the leather, defiber the leather texture and for other purposes, and can be achieved by running water technique using a drum.

The neutralization process for pretreatment is carried out to neutralize the collagen that cannot be removed from the leather by washing alone and the acid bound to the chromium complex to uniformize the penetration of the dye and stuffing agent, and can be achieved by neutralization treatment at pH 5 to 6 for 30 minutes to 2 hours using a neutralizing agent such as an alkaline or weakly alkaline base.

Examples of neutralizing agents include sodium bicarbonate, sodium acetate and sodium formate.

Dyeing is carried out by drum dyeing, paddle dyeing, etc. using a dye for the method of the present invention to obtain the desired color. Drum dyeing can be carried out by treatment with a dye solution being added while rotating the drum at pH 4.5 to 6.0 for a given period using water (50° to 60° C.) in a ratio of 190 to 300% to the shaving weight.

Stuffing can be carried out by adding a stuffing agent to a fresh bath after dyeing. Examples of usable stuffing agents include nonionic, anionic and cationic stuffing agents as well as raw oils and synthetic oils and fats.

This method is applicable to leather subjected to secondary tannin tanning after chromium tanning and leather subjected to secondary chromium tanning after tannin tanning, as well as leather tanned with chromium alone such as wet blue. It does not matter of what type the leather is, such as cow skin, pig skin, horse skin, sheep skin, goat skin, etc., as long as it has been subjected to chromium tanning. This method is also applicable to aluminum tanned leather, titanium-tanned leather and zirconium-tanned leather.

The mechanism of the action of the metal complex dye of the present invention on metal-tanned leather dyeing remains unclarified, but it is speculated that the dye of the present invention offers excellent color fastness to rubbing and good permeability in comparison with conventional dyes containing a sulfo group or a carboxyl group because the phosphono group contained in the dye of the present invention bounds to a metal such as chromium ion in metal-tanned leather by coordinate bond or reaction, and in addition, color fastness to light improves because a metal complex structure stable to light is formed due to metalization.

The metal complex dye of the present invention shows good permeability to metal-tanned leather, and metal-tanned leather dyed with the metal complex of the present invention offers excellent color fastness to rubbing in comparison with acid dyes and other dyes having no phosphono group and excellent color fastness to light in comparison with dyes having a phosphono group.

The present invention is hereinafter described in more detail by means of the following examples, but the invention is not by any means limited by them, as long as the gist of the invention is not overstepped.

SYNTHESIS OF METALIZABLE AZO COMPOUNDS

Synthesis Example 1

104 g (0.6 mol) of 3-aminobenzenephosphonic acid was dissolved in an aqueous solution of 90 g of concentrated hydrochloric acid in 400 ml of water. The resulting solution was cooled to 0° C. with ice, followed by diazotization using an aqueous solution of 42 g of sodium nitrite. After the excess portion of nitrous acid in the resultant diazonium salt solution was decomposed with sulfamic acid, 30 g of urea was added to the diazonium salt solution, followed by stirring at 0° C. for 30 minutes.

Separately, 191 g (0.6 mol) of H-acid was completely dissolved in 1500 ml of water. This solution, after being adjusted to pH 6.5 to 7.0 with sodium carbonate, was added to the above-mentioned diazonium salt solution.

Then, 50 g of sodium acetate was added, followed by adjustment to pH 3 with an aqueous solution of sodium carbonate and stirring at 0° to 10° C. overnight to yield a monoazo compound solution.

Then, 65 g (0.3 mol) of 3,3'-dihydroxybenzidine was dissolved in an aqueous solution of 90 g of concentrated hydrochloric acid in 500 ml of water. The resulting solution was cooled to 0° C. with ice, followed by tetrazotization using an aqueous solution of 42 g o±sodium nitrite. This solution was added to the above mentioned monoazo compound solution. After stirring at pH 8 to 9 and 0° to 8° C. for 5 hours, the mixture was heated to 60° C. and filtered, washed and dried to yield 350 g of a tetrakisazo compound (Compound Example 1; Compound Examples will be described later in the form of free acids.)

Synthesis Example 2

28 g (about 0.1 mol) of benzidine-3,3'-dicarboxylic acid was added to 600 ml of water, and dissolved while heating at 60° C. in the presence of sodium carbonate. To this solution, 30 g of hydrochloric acid was added. This mixture was cooled to 2° C. with ice, followed by tetrazotization using an aqueous solution of 15 g of sodium nitrite. Then, 20 g of urea was added, followed by stirring for a while.

Separately, 32 g of H-acid was dissolved in 150 ml of water while heating at 60° C. This solution, after being adjusted to pH 7 with an aqueous solution of sodium carbonate, was added to the above-mentioned tetrazotized product. After stirring at 0° to 10° C. overnight while maintaining pH 3.0 to 3.5 with an aqueous solution of sodium carbonate, this monoazo solution was adjusted to pH 8.5 with an aqueous solution of sodium carbonate. To this solution, 17.5 g (0.1 mol) of 3-aminobenzenephosphonic acid as diazotized by a standard method was added, followed by stirring at pH 8.5 for 4 hours. Then, 11 g (0.1 mol) of resorcinol was added, followed by stirring for 15 hours. This mixture was acidized by the addition of hydrochloric acid and heated to 70°0C., followed by filtration to yield 500 g of a cake containing a trisazo compound (Compound Example 3).

Synthesis Example 3

17.3 g (0.1 mol) of 3-aminobenzenephosphonic acid was dissolved in an aqueous solution of 20 g of concentrated hydrochloric acid in 100 ml of water. The resulting solution was cooled to 0° C. with ice, followed by diazotization using an aqueous solution of 7 g of sodium nitrite. After the excess portion of nitrous acid in the resultant diazonium salt solution was decomposed with 10 g of urea, an aqueous solution of 31.9 g (0.1 mol) of H-acid adjusted to pH 7 with sodium carbonate was added to the diazonium salt solution, followed by stirring at pH 3.0 to 3.5 for 24 hours. This mixture was adjusted to pH 8 with sodium carbonate, and dissolved completely to yield a monoazo compound solution.

Separately, 24.4 g (0.1 mol) of 3,3'-dimethoxybenzidine was tetrazotized by the method described above, followed by the addition of 10 g of urea and stirring for a while. To this tetrazonium salt solution, a solution of 11 g (0.1 mol) of resorcinol was added, followed by stirring at pH 5 for 2 hours. Then, the above mentioned monoazo compound solution was added. After stirring at pH 8 to 8.5 for 5 hours, this mixture was subjected to acidization and salting-out using dilute hydrochloric acid, followed by filtration, washing and drying to yield 90 g of a trisazo compound (Compound Example 9).

Synthesis Example 4

104 g (0.6 mol) of 3-aminobenzenephosphonic acid was dissolved in an aqueous solution of 90 g of concentrated hydrochloric acid in 400 ml of water. The resulting solution was cooled to 0° C. with ice, followed by diazotization using an aqueous solution of 42 g of sodium nitrite. After the excess portion of nitrous acid in the resultant diazonium salt solution was decomposed with sulfamic acid, 30 g of urea was added to the diazonium salt solution, followed by stirring at 0° C. for 30 minutes. Then, a solution of 83 g (0.6 mol) of p-cresidine in a mixture of 2000 ml of water and 72 g of aqueous hydrochloric acid was gradually added to the diazonium salt solution, followed by stirring at 5° to 10° C. overnight. The reaction mixture was filtered and washed. The cake thus obtained (monoazo compound represented by Formula [XI] was dispersed in 4000 ml of water, followed by the addition of 20 g of hydrochloric acid and stirring. Then, after diazotization using an aqueous solution of 42 g of sodium nitrite at 30+ to 40° C., 30 g of urea was added, followed by stirring for a while. Then, an aqueous solution of both 96 g (0.6 mol) of 1-amino-7-naphthol and 60 g of sodium hydroxide in 1200 ml of water was prepared. To this solution, the above-mentioned monoazo compound diazonium salt solution was added, followed by stirring at pH 8.0 to 8.5 for 4 hours. Then, this mixture was acidized to pH 4 with dilute hydrochloric acid and heated to 70° C., followed by filtration, washing and drying to yield 250 g of a disazo compound (Compound Example 11).

SYNTHESIS OF METAL COMPLEX DYES

Example 1

(Copper Complex Dye)

125 g (about 0.1 mol) of the compound obtained in Synthesis Example 1 (Compound Example 1) was added to 2000 ml of water. To this mixture, 50 g of copper sulfate ($CuSO_4 \cdot 5H_2O$) (Cu: about 0.2 gram atom) in 200 ml of warm water and then 100 g of ammonia were added, followed by stirring at pH 7.0 to 8.0 and 70° to 80° C. for 24 hours. After confirmation of the absence of unreacted compound, 100 g of ammonium chloride salt was added, followed by filtration, washing and drying to yield 170 g of a copper complex dye (Dye Example 1; Dye Examples will be given in Table 1 shown below; the colors shown in the table are those in the leather to be dyed.)

Example 2

(Nickel Complex Dye)

125 g (about 0.1 mol) of the compound obtained in Synthesis Example 1 (Compound Example 1) was treated with 50 g of nickel acetate ($Ni(CH_3COO)_2 \cdot 4H_2O$) in the same manner as Example 4 to yield a nickel complex dye (Dye Example 2).

Example 3

(Copper Complex Dye)

500 g of the wet cake containing the compound (Compound Example 3) obtained in Synthesis Example 2 was diluted with 3000 ml of water. After heating to 90° C., 30 g of copper sulfate ($CuSO_4 \cdot 5H_2O$) (Cu: about 0.2 gram atom) in 100 ml of warm water and then 30 g of 25% aqueous ammonia were added, followed by stirring at pH 7.0 to 8.0 and 80° to 90° C. for 20 hours. After confirmation of the absence of unreacted compound, 100 g of ammonium chloride was added, followed by filtration, washing and drying to yield 97 g of a copper complex dye (Dye Example 5).

Example 4

(Copper Complex Dye)

To 500 ml of ethylene glycol, 45 g (about 0.05 mol) of the compound obtained in Synthesis Example 3 (Compound Example 9) and 20 g of 30% aqueous ammonia were added, followed by the addition of 20 g of copper acetate ($Cu(CH_3COO)_2.H_2O$) and stirring at 95° to 100° C. until there was no unreacted compound. Then, about 500 ml of warm water and 100 g of $NH_4Cl$ were added. After salting-out, the mixture was filtered and dried to yield 50 g of a copper complex dye (Dye Example 11).

Example 5

(Cobalt Complex Dye)

45 g (about 0.05 mol) of the compound obtained in Synthesis Example 3 (Compound Example 9) was treated with 30 g of cobalt sulfate ($CoSO_4.7H_2O$) in the same manner as Example 7 to yield a cobalt complex dye (Dye Example 12).

Example 6

(Chromium Complex Dye)

7 30 g of chromium formate ($Cr(HCOO)_2$) was completely dissolved in 2000 ml of water. To this solution, 125 g (about 0.1 mol) of the compound obtained in Synthesis Example 1 (Compound Example 1) and sodium acetate were added, followed by stirring at pH 4 to 5 and 70° to 80° C. for 30 hours. Then, the mixture was treated with 15 g of ethanolamine, followed by filtration, washing and drying to yield 200 g of a chromium complex salt (Dye Example 4) in the form of an ethanolamine salt.

Examples 7 Through 13

The compounds of Compound Examples 2, 4, 5, 6, 7, 8 and 10 described below were each metalized with copper sulfate to yield copper complex dyes (Dye Examples 3, 6, 7, 8, 9, 10, and 13).

Example 14

(Copper Complex Dye)

30 g of copper sulfate ($CuSO_4.5H_2O$) was completely dissolved in 150 g of ethylene glycol. To this solution, 50 g (about 01.mol) of Compound Example 11 was added, followed by stirring at 140° to 150° C. for 5 hours. After confirmation of the absence of unreacted compound, 100 g of ammonium chloride and 500 ml of warm water were added, followed by filtration, washing and drying to yield 50 g of a copper complex dye (Dye Example 14).

Example 15

(Copper Complex Dye)

30 g of copper sulfate ($CuSO_4.5H_2O$ ) was dissolved in 150 g of ethylene glycol. To this solution, 50 g of ammonia and then 56 g (about 0.1 mol) of Compound Example 16 were added, followed by stirring at 95° to 100° C. for 15 hours. After confirmation of the absence of unreacted compound, 100 g of ammonium chloride and 500 ml of warm water were added, followed by salting-out, filtration, washing and drying to yield 65 g of a copper complex dye (Dye Example 19).

Example 16

(Copper Complex Dye)

25 g of copper chloride ($CuCl_2.2H_2O$) was completely dissolved in an aqueous solution of 60 g of ammonia in 1000 ml of water. To this solution, 62 g (about 0.1 mol) of Compound Example 14 was added, followed by stirring at 70° to 80° C. until there was no unreacted compound, After addition of 100 g of ammonium chloride and 500 ml of warm water, salting-out was conducted with sodium chloride, followed by filtration and drying to yield 70 g of a copper complex dye (Dye Example 17).

Example 17

(Nickel Complex Dye)

29.8 g of nickel acetate ($Ni(CH_3COO)_2.4H_2O$) was completely dissolved in 1000 ml of water. To this solution, 56 g (about 0.1mol) of Compound Example 23 was added, followed by stirring at 70°0 to 80°0 C. and pH 5 to 6.5 for 10 hours. After confirmation of the absence of unreacted compound, salting-out was carried out, followed by filtration and drying to yield 65 g of a nickel complex dye (Dye Example 26).

Example 18

(Chromium Complex Dye)

25 g of chromium acetate ($Cr(CH_3COO)_3.H_2O$) was completely dissolved in 800 ml of water while heating. To this solution, 64 g (about 0.1mol) of Compound Example 17 was added, followed by stirring at 70° to 80° C. and pH 5 to 6.5 until there was no unreacted compound. After salting-out with sodium chloride, this solution was filtered and dried to yield 65 g of a chromium complex dye (Dye Example 20).

Example 19

(Cobalt Complex Dye)

30 g of cobalt sulfate ($CoSO_4.7H_2O$) was completely dissolved in an aqueous solution of 60 g of ammonia in 1000 ml of water. To this solution, 56 g (about 0.1 mol) of Compound Example 12 was added, followed by stirring at 70° to 80° C. and pH 7 to 8 until there was no unreacted compound. This mixture was then treated with 8 g of ethanolamine and filtered, washed and dried to yield 67 g of a cobalt complex dye (Dye Example 15 ) in the form of an ethanolamine salt.

Examples 20 Through 30

The compounds listed in the column for compounds in Table 1 were treated in the same manner as above to yield metal complex dyes (Dye Examples 16, 18, 21 through 25 and 27 through 30 per Compound Examples 13, 15, 18 through 22 and 24 through 27) respectively comprising the metals listed in the column for metals in the same table.

Compound Examples
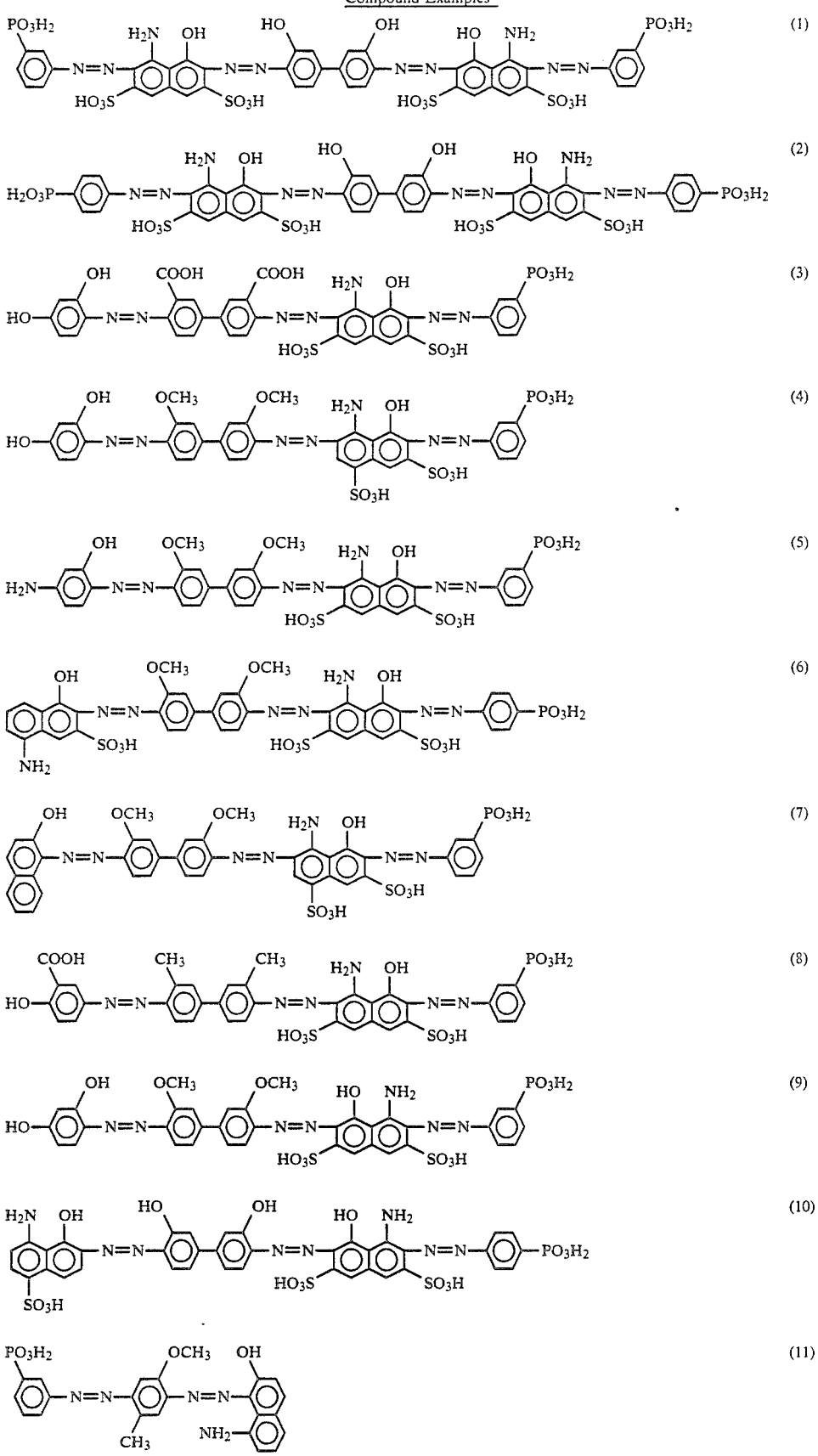

-continued
Compound Examples
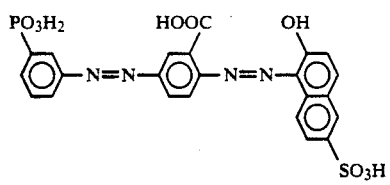 (12)
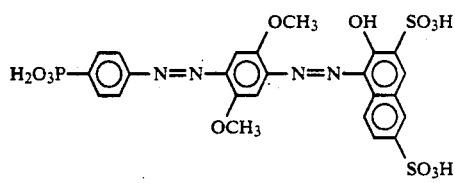 (13)
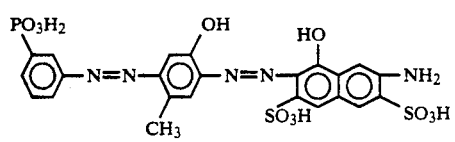 (14)
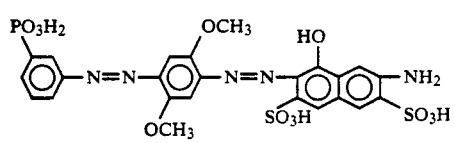 (15)
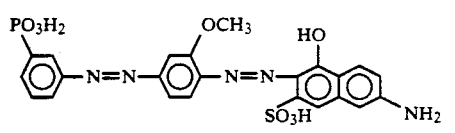 (16)
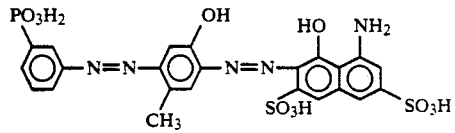 (17)
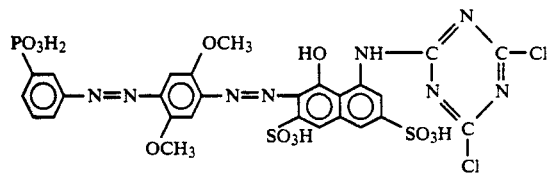 (18)
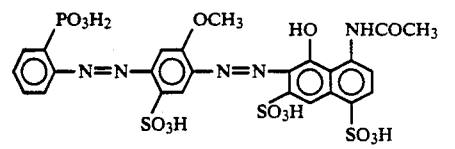 (19)
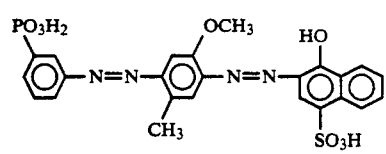 (20)
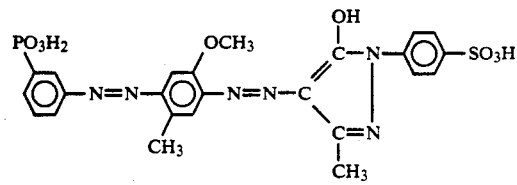 (21)

-continued

Compound Examples

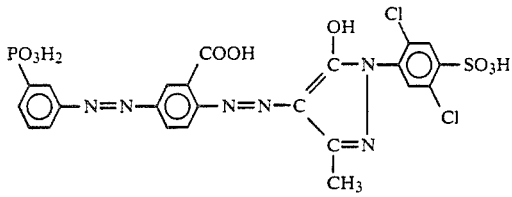
(22)

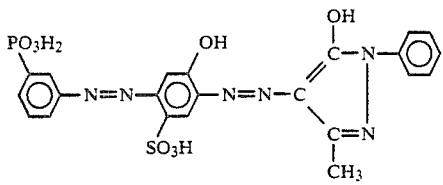
(23)

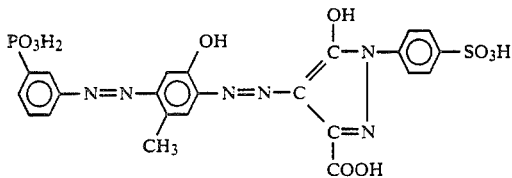
(24)

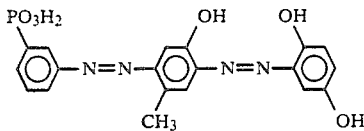
(25)

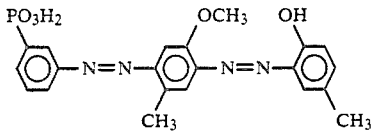
(26)

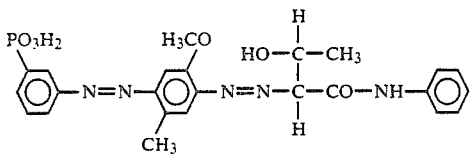
(27)

TABLE 1

| | (Dye Examples) | | |
|---|---|---|---|
| Dye (No.) | Compound (No.) | Metal | Color |
| 1 | (1) | Copper | Black |
| 2 | (1) | Nickel | Black |
| 3 | (2) | Copper | Black |
| 4 | (1) | Chromium | Black |
| 5 | (3) | Copper | Black |
| 6 | (4) | Copper | Black |
| 7 | (5) | Copper | Black |
| 8 | (6) | Copper | Black |
| 9 | (7) | Copper | Black |
| 10 | (8) | Copper | Black |
| 11 | (9) | Copper | Black |
| 12 | (9) | Cobalt | Black |
| 13 | (10) | Copper | Black |
| 14 | (11) | Copper | Black |
| 15 | (12) | Cobalt | Red |
| 16 | (13) | Copper | Purple |
| 17 | (14) | Copper | Black |
| 18 | (15) | Copper | Black |
| 19 | (16) | Copper | Purple |
| 20 | (17) | Chromium | Blue |
| 21 | (18) | Copper | Blue |
| 22 | (19) | Copper | Blue |
| 23 | (20) | Nickel | Purple |
| 24 | (21) | Cobalt | Red |
| 25 | (22) | Copper | Yellow |
| 26 | (23) | Nickel | Yellow |
| 27 | (24) | Copper | Orange |
| 28 | (25) | Iron(II) | Brown |
| 29 | (26) | Copper | Brown |
| 30 | (27) | Copper | Yellow |

Examples 31 Through 60

Chromium-Tanned Leather Dyeing With Metal Complex Dyes of the Present Invention (Dye Examples 1 Through 30

For pretreatment, wet blue (chromium-tanned cow skin, leather of 1 mm in thickness for clothing) was washed with running water, after which it was subjected to neutralization treatment with an aqueous solution of sodium bicarbonate at pH 5 to 6 while maintaining a temperature between 30° and 40° C. Then, the wet blue was subjected to drum dyeing at 60° C. for 30 minutes using a dye listed in Table 1 in a ratio of 2% to the weight of the above-mentioned wet blue and 190% of water. Note that when the water-soluble group of the dye was in the form of a free acid, the dye was previously dissolved in aqueous ammonia and used as a dye solution. After dyeing, formic acid was added for fixation. Further, water in a ratio of 250% to the weight of the wet blue was added, and the temperature was increased to 60° C. Then, 1.4% neutral oil (leather stuffening oil, produced by Yoshikawa Seiyu Co.) and 5.6% synthetic oil (MMP, produced by Orient Chemical Industries, Ltd.) as stuffening agents were added, followed by treatment for 60 minutes. Finally, formic acid was added for neutralization to Yield a dyed leather.

The color fastness to rubbing and permeability of the leathers thus obtained are shown in Table 2. The leathers all showed a good leveling property. The color fastness to light was determined by applying each sample to a fademeter (carbon arc type) and making comparisons with the ordinary status using a blue scale (JIS L0841). The duration of fademeter application was 80 hours in Examples 31 through 43 and 40 hours in Examples 44 through 60. The data on color fastness to rubbing shown in the table were obtained in a wet rubbing test using a resonance type rubbing tester in accordance with the standard rubbing test procedure (JIS L0849). Permeability was rated by observation of a cross section of each dyed leather.

To examine for phosphono group and differences in the effects of metalization, comparison experiments were performed as follows:

Comparison Example 1

A black dyed leather was obtained in the same manner as Example 31 except that the metal complex dye of Dye Example 1 was replaced with the corresponding tetrakisazo compound of Compound Example 1 (Comparison Dye q). The results of testing are shown in Table 3 below.

Comparison Example 2

A black dyed leather was obtained in the same manner as Example 35 except that the metal complex dye of Dye Example 5 was replaced with the corresponding trisazo compound of Compound Example 3 (Comparison Dye r). The results of testing are shown in Table 3 below.

Comparison Example 3

A black dyed leather was obtained in the same manner as Example 41 except that the metal complex dye of Dye Example 5 was replaced with the corresponding trisazo compound of Compound Example 9 (Comparison Dye s). The results of testing are shown in Table 3 below.

Comparison Example 4

Black dyed leather was obtained in the same manner as Examples 31 through 43 using a dye represented by the following structural formula (t) (Comparison Dye t). The results of testing are shown in Table 3 below.

Comparison Example 5

A black dyed leather was obtained in the same manner as Example 44 except that the metal complex dye of Dye Example 14 was replaced with the corresponding disazo compound of Compound Example 11 (Comparison Dye u). The results of testing are shown in Table 3 below.

Comparison Example 6

A black dyed leather was obtained in the same manner as Example 47 except that the metal complex dye of Dye Example 17 was replaced with the corresponding disazo compound of Compound Example 14 (Comparison Dye v). The results of testing are shown in Table 3 below.

Comparison Example 7

1 Red dyed leather was obtained in the same manner as Examples 44 through 60 using a dye represented by the following structural formula (w) (Comparison Dye w). The results of testing are shown in Table 3 below.

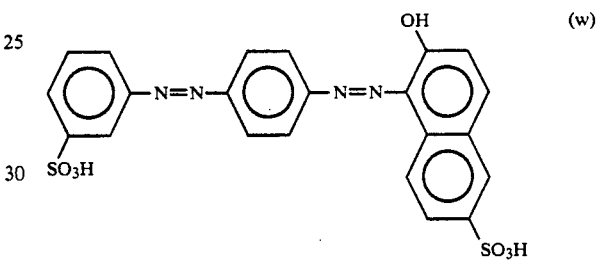

Comparison Example 8

Using a dye represented by the following structural formula (x) (Comparison Dye x), dyeing was carried out in the same manner as Examples 44 through 60. The results of testing are shown in Table 3 below.

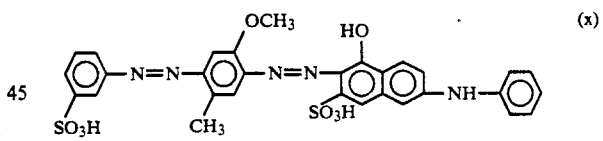

TABLE 2

| Examples | Dye Example (No.) | Color fastness to light (grade) | Color fastness to rubbing (grade) | Permiability |
| --- | --- | --- | --- | --- |
| 31 | 1 | 8 | 5 | ⊚ |
| 32 | 2 | 8 | 5 | ⊚ |
| 33 | 3 | 8 | 5 | ⊚ |
| 34 | 4 | 7-8 | 5 | ⊚ |
| 35 | 5 | 6 | 5 | ⊚ |
| 36 | 6 | 7 | 5 | ⊚ |
| 37 | 7 | 7 | 5 | ⊚ |
| 38 | 8 | 7 | 5 | ⊚ |

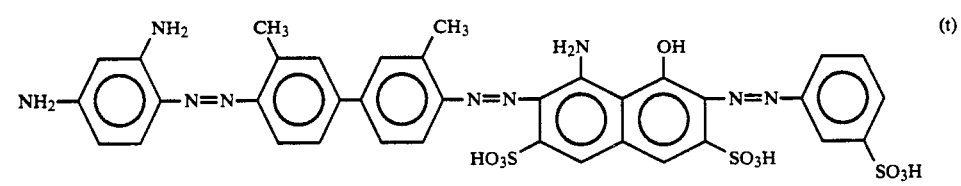

TABLE 2-continued

| Examples | Dye Example (No.) | Color fastness to light (grade) | Color fastness to rubbing (grade) | Permiability |
|---|---|---|---|---|
| 39 | 9 | 7 | 5 | ○ |
| 40 | 10 | 5-6 | 5 | ○ |
| 41 | 11 | 7 | 5 | ◉ |
| 42 | 12 | 7 | 5 | ◉ |
| 43 | 13 | 6-7 | 5 | ◉ |
| 44 | 14 | 6 | 5 | ○ |
| 45 | 15 | 5 | 5 | ◉ |
| 46 | 16 | 6 | 4 | ◉ |
| 47 | 17 | 5 | 4 | ◉ |
| 48 | 18 | 6 | 5 | ◉ |
| 49 | 19 | 5 | 5 | ◉ |
| 50 | 20 | 6 | 4 | ◉ |
| 51 | 21 | 7 | 5 | ◉ |
| 52 | 22 | 6 | 5 | ○ |
| 53 | 23 | 5 | 4 | ○ |
| 54 | 24 | 5 | 5 | ◉ |
| 55 | 25 | 6 | 5 | ◉ |
| 56 | 26 | 5 | 5 | ○ |
| 57 | 27 | 5 | 4 | ◉ |
| 58 | 28 | 4 | 4 | ○ |
| 59 | 29 | 5 | 5 | ◉ |
| 60 | 30 | 5 | 5 | ◉ |

Note:
◉: Excellent
○: Good

TABLE 3

| Comparison Example | Comparion Dye | Color fastness to light (grade) | Color fastness to rubbing (grade) | Permiability |
|---|---|---|---|---|
| 1 | q | 5 | 5 | ◉ |
| 2 | r | 4-5 | 5 | ◉ |
| 3 | s | 5 | 5 | ◉ |
| 4 | t | 4 | 3 | ○ |
| 5 | u | 4 | 4-5 | ○ |
| 6 | v | 3 | 4 | ◉ |
| 7 | w | 3 | 2-3 | △ |
| 8 | x | 3 | 3 | ○ |

Note:
◉: Excellent
○: Good
△: Slightly poor
X: poor

What is claimed is:

1. A metal complex dye comprising a metalizable polyazo compound represented by Formula [I]:

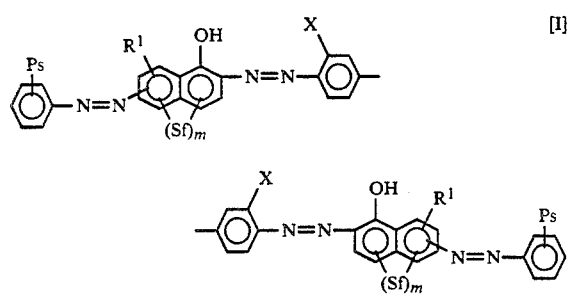

wherein Ps is a phosphono group in the form of the free acid or a salt thereof; Sf is a sulfo group in the form of the free acid or a salt thereof; m is 0, 1 or 2; X is hydroxyl, alkoxy having a carbon number of 1 or 2 or carboxyl; and $R^1$ is hydrogen or amino.

2. A metal complex dye comprising a metalizable polyzao compound represented by Formula [II]:

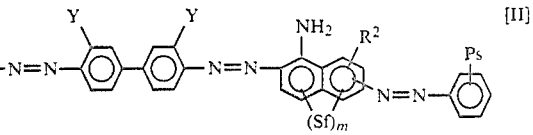

wherein Ps is a phosphono group in the form of the free acid or a salt thereof; Sf is a sulfo group in the form of the free acid or a salt thereof; m is 0, 1 or 2; X is hydroxyl, alkoxy having a carbon number of 1 or 2, carboxyl or methyl; $R^2$ is hydrogen or hydroxyl; and Z is phenyl group of napthyl group selected from the group consisting of the following (1) through (4):

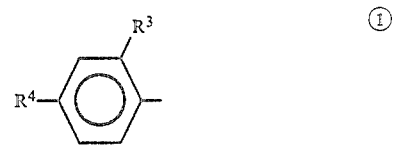

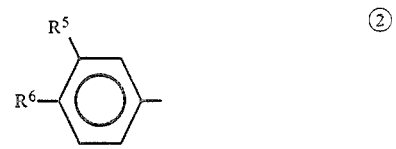

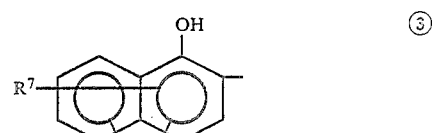

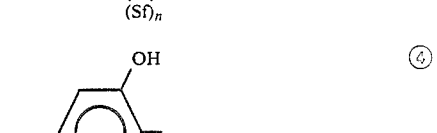

wherein $R^3$ is hydroxyl or carboxyl; $R^4$ is hydroxyl, carboxyl or amino; each of $R^5$ and $R^6$ independently is hydroxyl or carboxyl; each of $R^7$ and $R^8$ independently is hydrogen, hydroxyl or amino; Sf is the same as defined above; and n is 0, 1 or 2.

3. A metal complex dye comprising a metalizable polyazo compound represented by Formula [III]:

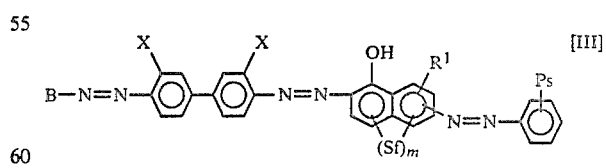

wherein Ps is a phosphono group in the form of the free acid or a salt thereof; Sf is a sulfo group in the form of the free acid or a salt thereof; m is 0, 1 or 2; X is hydroxyl, alkoxy having a carbon number of 1 or 2 or carboxyl; $R^1$ is hydrogen or amino; and B is phenyl group or naphthyl group selected from the group consisting of the following (1) through (4):

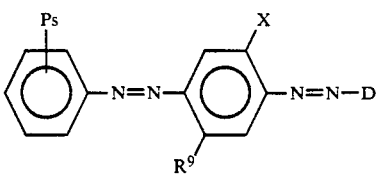

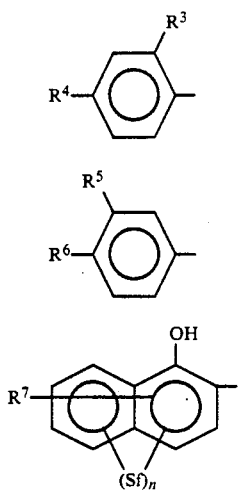

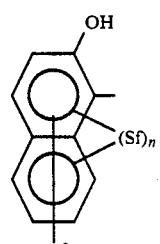

wherein each of $R^3$ and $R^4$ independently is hydroxyl, carboxyl or amino; each of $R^5$ and $R^6$ independently is hydroxyl or carboxyl; each of $R^7$ and $R^8$ independently is hydrogen, hydroxyl or amino; Sf is the same as defined above; and n is 0, 1 or 2.

4. A metal complex dye comprising a metalizable disazo compound represented by Formula [IV]:

wherein Ps is a phosphono group in the form of the free acid or a salt thereof; X is hydroxyl, alkoxy having a carbon number of 1 or 2 or carboxyl; $R^9$ is hydrogen, methyl, alkoxy having a carbon number of 1 or 2 or Sf, wherein Sf is a sulfo group in the form of the free acid or a salt thereof; and D is a coupling component residue having a metalizable hydroxyl at the position adjacent to the carbon atom connected to the azo group and selected from the group consisting of dihydroxyphenyl, methyl-hydroxyphenyl and phenyl-hydroxyphenyl.

5. A metal complex dye represented by Formula [a]:

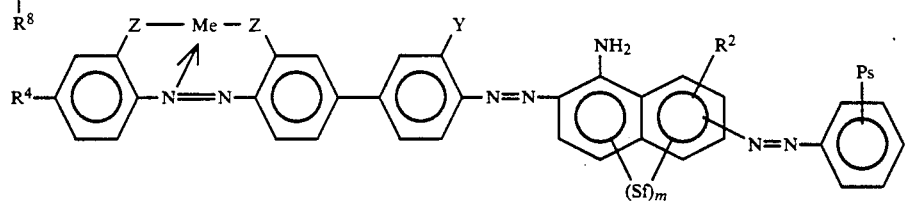

wherein Ps is a phosphono group in the form of the free acid or a salt therof; Sf is a sulfo group in the form of the free acid or a salt thereof; m is 0, 1 or 2; $R^1$ is hydrogen or amino; Z is —O— or —COO—; and Me is copper, nickel, cobalt, iron or chromium.

6. A metal complex dye represented by Formula [b]:

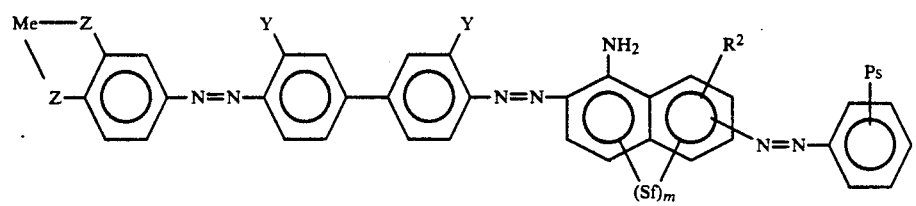

wherein Ps is a phosphono group in the form of the free acid or a salt thereof; Sf is a sulfo group in the form of the free acid or a salt thereof; m is 0, 1 or 2; Y is hydroxyl, alkoxy having a carbon number of 1 or 2, carboxyl or methyl; $R^2$ is hydrogen or hydroxyl; $R^4$ is hydroxyl, carboxyl or amino; Z is —O—or —COO—; and Me is copper, nickel, cobalt, iron or chromium.

7. A metal complex dye represented by Formula [c]:

wherein Ps is a phosphono group in the form of the free acid or a salt thereof; Sf is a sulfo group in the form of the free acid or a salt thereof; m is 0, 1 or 2; Y is hydroxyl, alkoxy having a carbon number of 1 or 2, carboxyl or methyl; $R^2$ is hydrogen or hydroxyl; Z is —O—or —COO—; and Me is copper, nickel, cobalt, iron or chromium.

8. A metal complex dye represented by Formula [d]:

—O— or —COO—; and Me is copper, nickel, cobalt, iron or chromium.

10. A metal complex dye represented by Formula [f]:

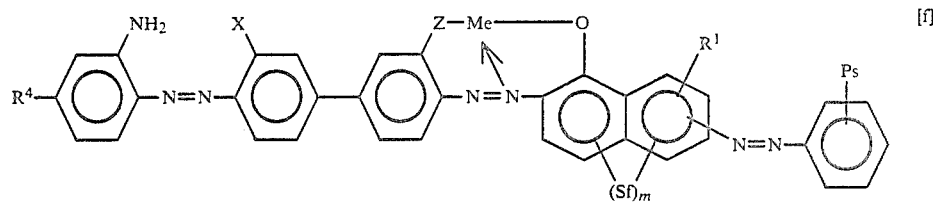

wherein Ps is a phosphono group in the form of the free acid or a salt thereof; Sf is a sulfo group in the form of

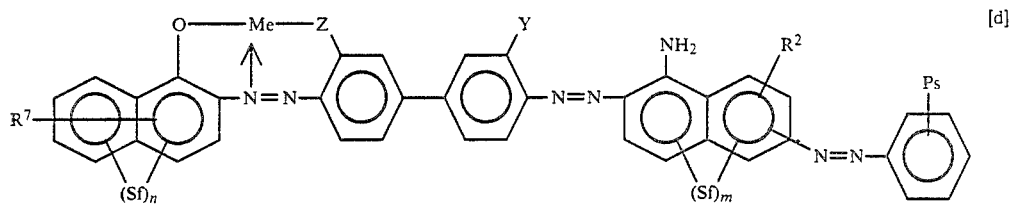

wherein Ps is a phosphono group in the form of the free acid or a salt thereof; Sf is a sulfo group in the form of the free acid or a slat thereof; m is 0, 1 or 2; Y is hydroxyl, alkoxy having a carbon number of 1 or 2, carboxyl or methyl; $R^2$ is hydrogen or hydroxyl; $R^7$ is hydrogen, hydroxyl or amino; n is 0, 1 or 2; Z is —O— or —COO—; and Me is copper, nickel, cobalt, iron or chromium.

9. A metal complex dye represented by Formula [e]:

the free acid or a salt thereof; m is 0, 1 or 2; X is hydroxyl, alkoxy having a carbon number of 1 or 2 or carboxyl; $R^1$ is hydrogen or amino; $R^4$ is hydroxyl, carboxyl or amino; Z is —O— or —COO—; and Me is copper, nickel, cobalt, iron or chromium.

11. A metal complex dye represented by Formula [g]:

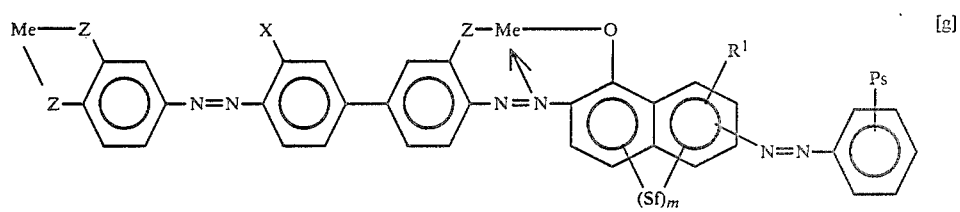

wherein Ps is a phosphono group in the form of the free acid or a salt thereof; Sf is a sulfo group in the form of the free acid or a salt thereof; m is 0, 1 or 2; X is hydroxyl, alkoxy having a carbon number of 1 or 2 or carboxyl; $R^1$ is hydrogen or amino; Z is —O— or —COO—; and Me is copper, nickel, cobalt, iron or chromium.

12. A metal complex dye represented by Formula [h]:

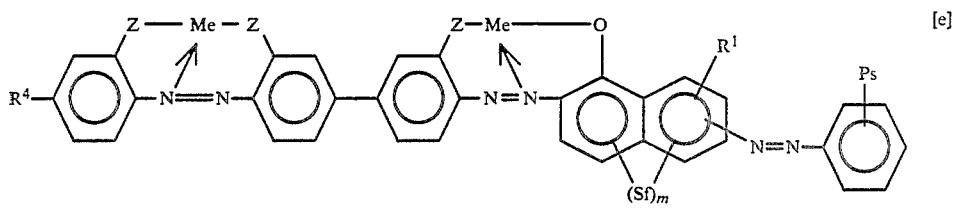

wherein Ps is a phosphono group in the form of the free acid or a salt thereof; Sf is a sulfo group in the form of the free acid or a salt thereof; m is 0, 1 or 2; $R^1$ is hydrogen or amino; $R^4$ is hydroxyl, carboxyl or amino; Z is

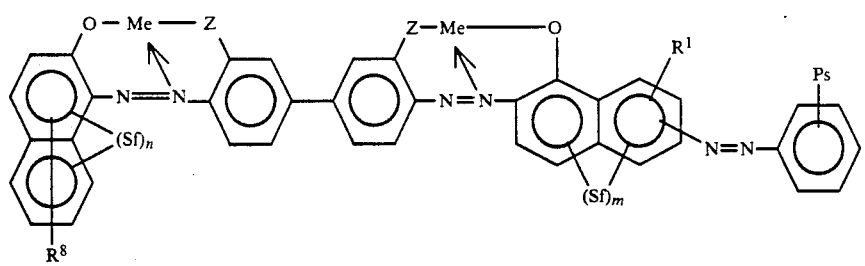
[h]

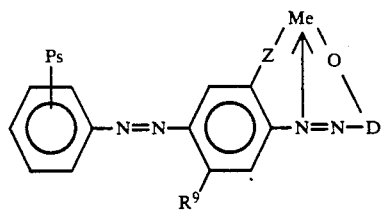
[i]

wherein Ps is a phosphono group in the form of the free acid or a salt thereof; Sf is a sulfo group in the form of the free acid or a slat thereof; m is 0, 1 or 2; $R^1$ is hydrogren or amino; $R^8$ is hydrogen, ydroxyl or amino; n is 0, 1 or 2; Z is —O— or —COO—; and Me is copper, nickel, cobal, iron or chromium.

13. A metal complex dye represented by Formula [i]: wherein Ps is a phosphono group in the form of the free acid or a salt thereof; $R^9$ is hydrogen, methyl, alkoxy having a carbon number of 1 or 2 or Sf, wherein Sf is a sulfo group in the form of the free acid or a salt thereof; Z is —O— or —COO—; and Me is copper, nickel, cobalt, iron or chromium; and D is hydroxy-1,2-phenylene, methyl-1,2-phenylene or phenyl-1,2-phenylene.

* * * * *